(12) United States Patent  (10) Patent No.: US 9,688,047 B2
Inami et al. (45) Date of Patent: Jun. 27, 2017

(54) HEMMED STRUCTURE AND HEMMING METHOD

(71) Applicant: Fuji Jukogyo Kabushiki Kaisha, Tokyo (JP)

(72) Inventors: Akiko Inami, Tokyo (JP); Keiji Nakamura, Tokyo (JP); Kensuke Sakai, Tokyo (JP); Noboru Sakamoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/842,107

(22) Filed: Sep. 1, 2015

(65) Prior Publication Data
US 2016/0082687 A1 Mar. 24, 2016

(30) Foreign Application Priority Data

Sep. 22, 2014 (JP) .................................. 2014-192785

(51) Int. Cl.
*B29C 53/06* (2006.01)
*B32B 3/04* (2006.01)
(Continued)

(52) U.S. Cl.
CPC .............. *B32B 3/04* (2013.01); *B29C 53/063* (2013.01); *B29C 65/02* (2013.01); *B29C 65/56* (2013.01); *B29C 66/0222* (2013.01); *B29C 66/1352* (2013.01); *B29C 66/43* (2013.01); *B29C 66/7392* (2013.01); *B29C 66/742* (2013.01); *B32B 15/08* (2013.01); *B32B 15/14* (2013.01); *B32B 15/18* (2013.01); *B32B 15/20* (2013.01); *B32B 27/18* (2013.01); *B32B 27/28* (2013.01);
(Continued)

(58) Field of Classification Search
CPC ..... Y10T 428/24215; Y10T 428/24223; B29C 53/06; B29C 53/063; B29C 53/066
USPC .......................................................... 428/124
See application file for complete search history.

(56) References Cited

U.S. PATENT DOCUMENTS

2002/0130438 A1* 9/2002 Jambor ................. B29C 53/063
264/296
2011/0123780 A1 5/2011 Borger et al.

FOREIGN PATENT DOCUMENTS

CH 704798 A2 10/2012
CN 102015143 A 4/2011
(Continued)

OTHER PUBLICATIONS

Decision of Grant dated Dec. 22, 2015 issued in corresponding Japanese Patent Application No. 2014-192785.
(Continued)

*Primary Examiner* — Alexander Thomas
(74) *Attorney, Agent, or Firm* — Troutman Sanders LLP

(57) ABSTRACT

A hemmed structure includes a first member and a second member. The first member is a sheet-like member including a thermoplastic resin and includes an inner bent portion formed at a position at which an end portion of the first member is bent. The second member is a sheet-like member a metal material and includes an outer bent portion formed at a position at which an end portion of the second member is bent. The outer bent portion is disposed so as to wrap around the inner bent portion, and the end portion of the second member is disposed inside the inner bent portion. A brittle portion is formed on an inner surface of the inner bent portion.

9 Claims, 3 Drawing Sheets

(51) Int. Cl.
| | |
|---|---|
| B29C 65/02 | (2006.01) |
| B32B 15/08 | (2006.01) |
| B32B 15/14 | (2006.01) |
| B32B 15/18 | (2006.01) |
| B32B 15/20 | (2006.01) |
| B32B 27/18 | (2006.01) |
| B32B 27/28 | (2006.01) |
| B32B 27/30 | (2006.01) |
| B32B 27/36 | (2006.01) |
| B32B 27/42 | (2006.01) |
| B29C 65/56 | (2006.01) |
| B29C 65/00 | (2006.01) |
| B29L 31/30 | (2006.01) |

(52) U.S. Cl.
CPC ......... *B32B 27/308* (2013.01); *B32B 27/365* (2013.01); *B32B 27/42* (2013.01); *B29C 66/721* (2013.01); *B29L 2031/30* (2013.01); *B29L 2031/3002* (2013.01); *B32B 2260/021* (2013.01); *B32B 2260/046* (2013.01); *B32B 2262/106* (2013.01); *B32B 2307/546* (2013.01); *B32B 2605/00* (2013.01); *B32B 2605/003* (2013.01)

(56) References Cited

FOREIGN PATENT DOCUMENTS

| | | |
|---|---|---|
| JP | S60-61231 A | 4/1985 |
| JP | 2004-262119 A | 9/2004 |
| JP | 2010-30264 A | 2/2010 |
| JP | 2011-245514 A | 12/2011 |
| JP | 2012-126013 A | 7/2012 |

OTHER PUBLICATIONS

German Office Action dated Nov. 21, 2016 issued in corresponding German Patent Application No. 102015115788.8.
Chinese Office Action dated Mar. 15, 2017 issued in corresponding Chinese Application No. 201510601792.2.

* cited by examiner

HEMMED STRUCTURE AND HEMMING METHOD

CROSS-REFERENCE TO RELATED APPLICATIONS

The present application claims priority from Japanese Patent Application No. 2014-192785 filed on Sep. 22, 2014, the entire contents of which are hereby incorporated by reference.

BACKGROUND

1. Technical Field

The present invention relates to a hemmed structure and a hemming method.

2. Related Art

To date, techniques have been devised to suppress the deterioration of the external appearance of panel members of a vehicle and to maintain a strong fastening force at edges of the panel members. For instance, there has been disclosed a panel member and a method for making the panel member, the panel member including a first flange, a second flange, a first portion, a second portion, and the like. In the panel member, the thickness of and the distances between some of the flanges and portions are set in a certain range (see Claim 1, paragraphs [0050] to [0060], and FIG. 6 of Japanese Unexamined Patent Application Publication (JP-A) No. 2011-245514). In the technique described in JP-A No. 2011-245514, metal sheets, such as steel sheets, are placed one on top of the other, and a hem is formed by, for instance, seaming or bending edges of the sheets.

SUMMARY OF THE INVENTION

In recent years, in order to reduce the weight of a vehicle, the use of synthetic resin sheets, instead of metal sheets that are generally used, has been examined. However, because the properties of a metal and a resin differ considerably from each other, there is a possibility that a secure hem cannot be obtained by using an existing hemmed structure or an existing hemming method. Therefore, a new hemmed structure, a new hemming method, and the like have been desired.

It is desirable to provide a hemmed structure in which a metal sheet and a synthetic resin sheet are securely fixed in position and a hemming method for making the hemmed structure.

A first aspect of the present invention provides a hemmed structure including a first member that is a sheet-like member including a thermoplastic resin and a second member that is a sheet-like member including a metal material. The first member includes an inner bent portion formed at a position at which an end portion of the first member is bent. The second member includes an outer bent portion formed at a position at which an end portion of the second member is bent. The outer bent portion is disposed so as to wrap around the inner bent portion, and the end portion of the second member is disposed inside the inner bent portion. A brittle portion is formed on an inner surface of the inner bent portion.

The second member may include a sharp bend that is formed by being bent back at a position near the brittle portion and inside the inner bent portion.

The brittle portion is a recess having a heat mark and a press mark.

The thermoplastic resin may be a fiber-reinforced plastic.

A second aspect of the present invention provides a hemming method for making a hemmed structure. The method includes a placement step of placing a first member and a second member one on top of the other so that an end portion of the first member and an end portion of the second member are displaced from each other, the first member including a thermoplastic resin and having a sheet-like shape, and a second member including a metal material and having a sheet-like shape; a first bending step of bending the end portion of the second member so as to wrap around the end portion of the first member; a press heating step of forming a brittle portion in the first member by pressing and heating either one of the first member and the second member at a position near the end portion of the second member; and a second bending step of bending the first member and the second member at the brittle portion so that the first member is disposed inside the second member.

DETAILED DESCRIPTION

A hemmed structure and a hemming method according to examples of the present invention will be described with reference to the drawings.

(1) Part of Vehicle in which Example According to Present Invention is Used

Figure 1:
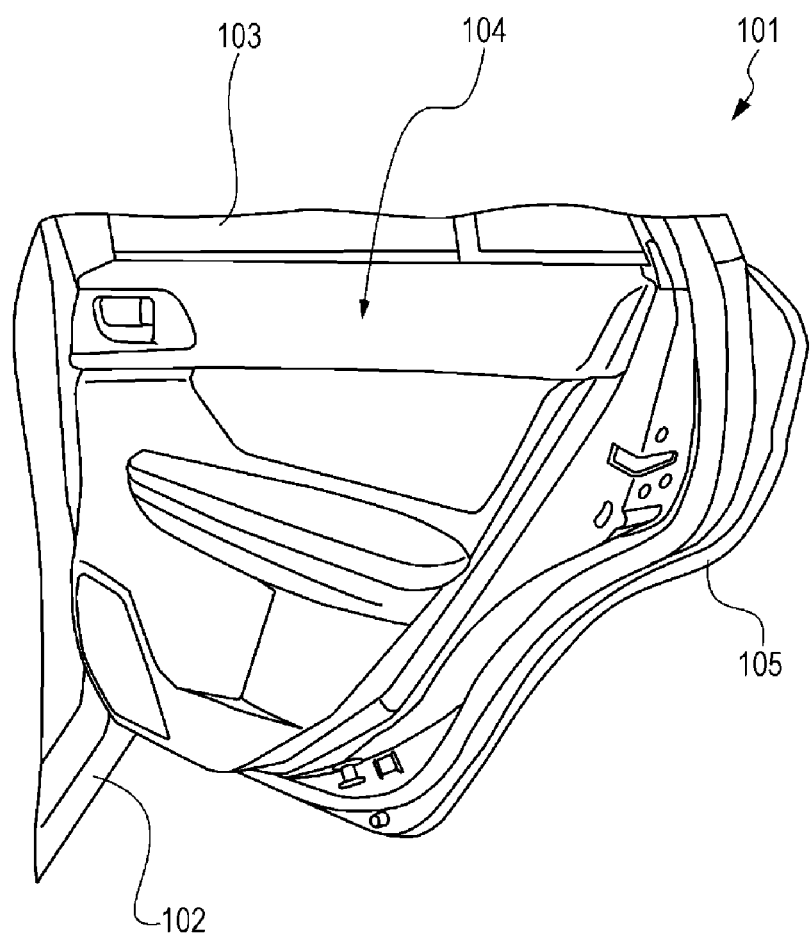
FIG. 1 is a partial schematic view illustrating a vehicle door including a hemmed structure according to an example of the present invention.

A hemmed structure according to an example of the present invention can be used, for instance, at an edge of a door of a vehicle. FIG. 1 is a partial schematic view illustrating a vehicle door 101, which is an instance of a part in which a hemmed structure according to an example of the present invention can be used.

The vehicle door 101 illustrated in FIG. 1 is attached to a center pillar (not illustrated) by using a hinge or the like. The center pillar extends upward from a side sill 102, which is a covering member extending in the front-back direction of the vehicle. The vehicle door 101 includes a door glass 103 that can be opened and closed, an operation lever that is used to open and close the vehicle door 101, and an interior member 104 on which buttons and the like for opening and closing the door glass 103 are disposed. A hem 105 is formed at an edge of the vehicle door 101. The hem 105 is formed by joining an inner panel, which is a covering member on the passenger compartment side, and an outer panel, which is a covering member on the outer side, to each other.

In recent years, in order to reduce the weight of a vehicle, the use of a synthetic resin sheet as an inner panel has been examined. However, because a steel sheet made of an iron-based material or a sheet made of an aluminum-based material has been used as an inner panel and an outer panel to date, it is necessary to devise new methods for, for instance, machining a synthetic resin sheet and combining the synthetic resin sheet with a metal sheet. Thus, the hemmed structure according to the present example can be used as, for instance, a hem formed at an edge of the vehicle door 101.

(2) Hemmed Structure

Figure 2A:
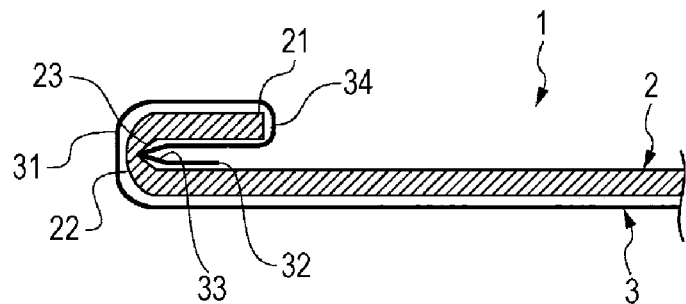
FIG. 2A is a schematic view illustrating a hemmed structure according to an example, the hemmed structure including a second member that has a sharp bend.
Figure 2B:
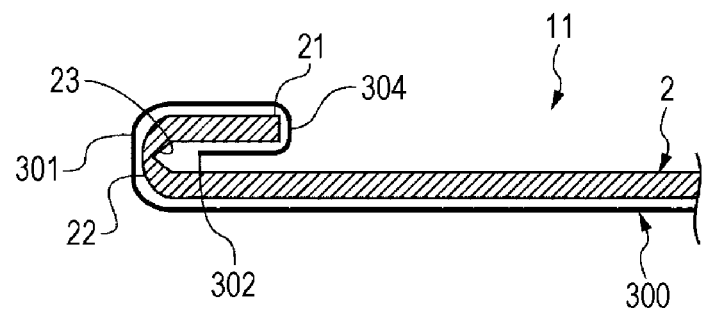
FIG. 2B is a schematic view illustrating a hemmed structure according to a modification of the example, the hemmed structure including a second member that does not have a sharp bend.

FIGS. 2A and 2B illustrate hemmed structures according to an example and a modification of the example of the present invention. FIGS. 2A and 2B are schematic views respectively illustrating a hemmed structure 1 and a hemmed structure 11. The hemmed structure 1 illustrated in FIG. 2A includes a second member that has a sharp bend. The hemmed structure 11 illustrated in and FIG. 2B includes a second member that does not have a sharp bend.

The hemmed structure 1 illustrated in FIG. 2A includes a first member 2 and a second member 3.

The first member 2 is a sheet-like member including a thermoplastic resin. The first member 2 includes an inner bent portion 22 formed at a positon at which an end portion 21 of the first member 2 is bent. In other words, the inner bent portion 22 is formed at and around a bend that is formed by bending the first member 2. The first member 2 is formed by bending the end portion 21 through about 180° while simultaneously bending a part of the second member 3 as described below. In the case where the present example is used in the vehicle door 101 illustrated in FIG. 1, the first member 2 can be used as an inner panel.

The first member 2 includes a brittle portion 23 in an inner surface of the inner bent portion 22. The brittle portion 23 is a recess having a heat mark and a press mark. The brittle portion 23 is a groove having a wedge-shaped cross section, and a part of the second member 3 is clamped inside the brittle portion 23. The brittle portion 23 is formed when making the hemmed structure 1. The process of forming the brittle portion 23 will be described below in detail in the description of a method for making the hemmed structure 1.

The second member 3 is a sheet-like member including a metal material. The second member 3 includes an outer bent portion 31 formed at a position at which an end portion 32 of the second member 3 is bent. The outer bent portion 31 is disposed so as to wrap around the inner bent portion 22, and the end portion 32 of the second member 3 is disposed inside the inner bent portion 22. The outer bent portion 31 is formed at and around a bend that is formed by bending the second member 3. The second member 3 includes a sharp bend 33 that is formed at a position near the brittle portion 23, inside the inner bent portion 22, and between the outer bent portion 31 and the end portion 32. In the case where the present example is used in the vehicle door 101 illustrated in FIG. 1, the second member 3 can be used as an outer panel.

As illustrated in FIG. 2A, the end portion 32 of the second member 3 is bent back at the sharp bend 33 near the brittle portion 23. A bend 34 is formed by bending the second member 3 so as to wrap around the end portion 21 of the first member 2. Moreover, the outer bent portion 31 is formed by bending the second member 3 so as to wrap around the inner bent portion 22 of the first member 2.

The thicknesses of the first member 2 and the second member 3 and the distance between the first member 2 and the second member 3 are not limited to those schematically illustrated in FIGS. 2A and 2B, as long as the object of the present invention can be achieved. For instance, the thicknesses and the distance may be set at values that are generally used in a part of a vehicle or the like in which an example of the present invention is used. Preferably, a part of the first member 2 including the end portion 21 and the inner bent portion 22 and a part of the second member 3 including the outer bent portion 31, the sharp bend 33, and the bend 34 illustrated in FIG. 2A are in close contact with each other by being strongly press-formed in the last step of forming the hemmed structure. In this case, for instance, when the hemmed structure is used in a vehicle door, the bends do not easily become loose due to vibration, impact, and the like, which are applied to the vehicle door when, for instance, the door is opened or closed.

As long as the sharp bend 33 is formed at a position near the brittle portion 23, the sharp bend 33 may or may not be in contact with the brittle portion 23. Preferably, the sharp bend 33 is in contact with the brittle portion 23 and clamped inside the brittle portion 23. In this case, the sharp bend 33 is securely held by the first member 2.

In the present example, the brittle portion 23 and the sharp bend 33 have wedge-shaped cross sections. Alternatively, these portions may have inwardly curved cross sections. The brittle portion 23 and the sharp bend 33 in the present example, having wedge-shaped cross sections, can be made by using a pressing member having a sharp edge. A brittle portion 23 and a sharp bend 33 that have inwardly curved cross sections can be made by using a pressing member having a curved edge.

According to the present example, by forming the brittle portion 23, which has a recessed shape, in the first member 2 by using an appropriate pressing member, the sharp bend 33, which has the same recessed shape as the brittle portion 23, is formed at a position near the end portion 32 of the second member 3, irrespective of the shape of the end of the pressing member. A method for forming the brittle portion 23 and the sharp bend 33 will be described below with reference to FIGS. 3A to 4C.

To date, only members including metal materials have been predominantly used as a hem of a vehicle or the like. When making a hem from members including metal materials, a plurality of sheet-like members have been fixed to each other by spot welding, adhesion using an adhesive, or mechanical fastening using rivets. By using these exiting fixing methods, the sheet-like members can be securely fixed in position relative to each other.

However, in recent years, reduction in the weight of a vehicle has been increasingly desired. Accordingly, the use of a resin material, which is lighter than a metal material, as part of the exterior or the interior of a vehicle has been examined. Preferably, the resin material is a thermoplastic resin in consideration of the workability of the material when manufacturing a vehicle. For instance, a thermoplastic resin may be used as the material of one of an outer panel and an inner panel in which a hem is to be formed, and a metal material may be used as the material of the other. In this case, however, it is difficult to use exiting fixing methods, such as welding, adhesion, and mechanical fastening to fix these panels to each other, because the properties of the thermoplastic resin and the metal material differ considerably from each other.

The hemmed structure 1 illustrated in FIG. 2A can be made by forming the inner bent portion 22, the outer bent portion 31, the sharp bend 33, the bend 34, and the like without using an exiting fixing methods, such as welding. In the hemmed structure 1, the end portion 21 of the first member 2 is disposed so as to be wrapped inside the bend 34 of the second member 3, the end portion 32 of the second member 3 is disposed so as to be wrapped in the inner bent portion 22 of the first member 2, and the sharp bend 33 of the second member 3 is clamped in the brittle portion 23 of the first member 2. Thus, the first member 2 and the second member 3 are rolled onto each other. Therefore, the first member 2, which is made of a resin, and the second member 3, which is of a metal, can be securely fixed in position relative to each other.

FIG. 2B illustrates a modification of the example illustrated in FIG. 2A. The hemmed structure 11 illustrated in FIG. 2B differs from the hemmed structure 1 described above in the length of the second member and the presence/absence of the sharp bend. Detailed description of the first member 2 is omitted, because the first member 2 of the hemmed structure 11 is the same as that of the hemmed structure 1.

A second member 300 illustrated in FIG. 2B is shorter than the second member 3 described above. To be specific, as illustrated in FIG. 2B, the length of a part of the second member 300, which is bent so as to wrap around the end portion 21 of the first member 2, from a bend 304 to an end portion 302 is smaller than the length of a part of the second member 3 from the bend 34 to the end portion 32. The end portion 302 of the second member 300 extends to a position near the brittle portion 23 but is not bent back at the position. Thus, the second member 300 does not have a bent-back portion like the sharp bend 33 described above.

The hemmed structure 11 does not include a portion that is clamped in the brittle portion 23 like the sharp bend 33 described above. Even in this case, the end portion 21 of the first member 2 is disposed so as to be wrapped inside the bend 304 of the second member 300, and the end portion 302 of the second member 300 is disposed so as to be wrapped in the inner bent portion 22 of the first member 2. Thus, the first member 2 and the second member 300 are rolled onto each other, and therefore the first member 2 and the second member 300 can be securely fixed in position relative to each other.

(3) Material of Each Member

A thermoplastic resin can be used as the material of the first member 2 of the hemmed structure 1. For instance, the thermoplastic resin may be methyl methacrylate, polyacetal, polycarbonate, modified polyphenylene, polyimide resin, polyetheretherketone, or the like. Preferably, a resin that is reinforced with fiber, such as a fiber-reinforced plastic, is used, and more preferably, a carbon fiber-reinforced plastic is used.

The material of the second member 3 is not particularly limited and may be any existing material that has been used as the exterior of a vehicle. For instance, iron, an iron-based composite material, aluminum, an aluminum composite, or the like may be used.

(4) Hemming Method

Figure 3A:
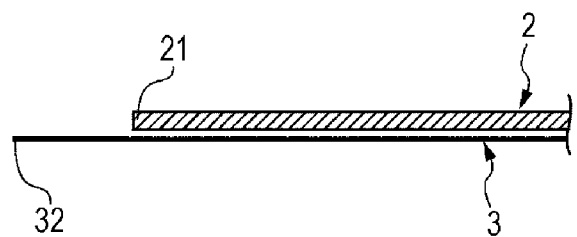
FIG. 3A is a schematic view illustrating an instance of a placement step of a hemming method according to an example of the present invention.
Figure 3B:
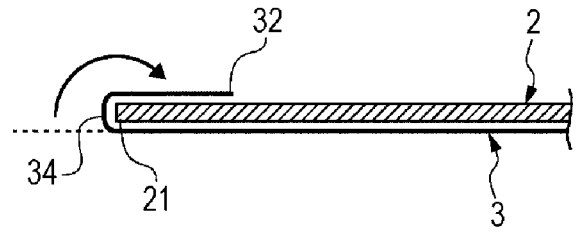
FIG. 3B is a schematic view illustrating an instance of a first bending step of the hemming method.
Figure 4A:
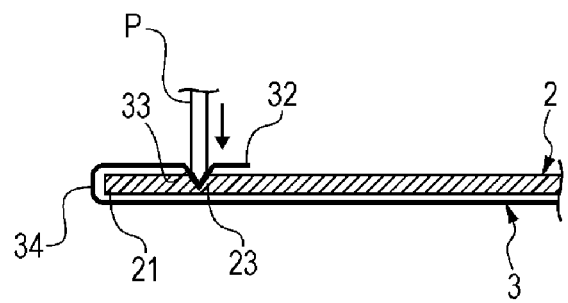
FIG. 4A is a schematic view illustrating an instance of a press heating step of the hemming method.
Figure 4B:
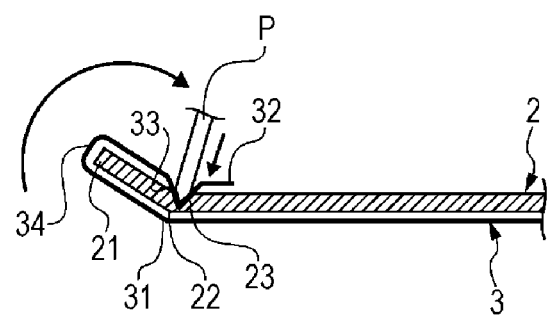
FIGS. 4B and 4C are schematic views illustrating an instance of a second bending step of the hemming method.

Referring to FIGS. 3A to 4B, a hemming method according to an example of the present invention, for making the hemmed structure 1 illustrated in FIG. 2A, will be described. The hemming method includes a placement step, a first bending step, a press heating step, and a second bending step. These steps will be described with reference to FIGS. 3A to 4B. FIGS. 3A and 3B are schematic views illustrating the hemming method according to the example of the present invention. FIG. 3A illustrates an instance of the placement step, and FIG. 3B illustrates an instance of the first bending step. FIGS. 4A to 4C are schematic views illustrating the hemming method according to the example of the present invention. FIG. 4A illustrates an instance of the press heating step, and FIGS. 4B and 4C illustrate an instance of the second bending step.

FIG. 3A illustrates the placement step. To be specific, in the placement step illustrated in FIG. 3A, the first member 2, including a thermoplastic resin and having a sheet-like shape, and the second member 3, including a metal material and having a sheet-like shape, are placed one on top of the other so that the end portion 21 and the end portion 32 are displaced from each other. Usually, the positions of a bending roller, a pressing member P described below, and the like are fixed. Therefore, whether the sharp bend 33 will be formed depends on the magnitude of the displacement between the first member 2 and the second member 3.

FIG. 3B illustrates the first bending step. To be specific, in the first bending step illustrated in FIG. 3B, the bend 34 is formed by bending the end portion 32 of the second member 3 so that the end portion 21 of the first member 2 is wrapped inside the bend 34. The first bending step can be performed by using an appropriate bending apparatus, such as a roller forming apparatus. Regarding the position of the bend 34, the second member 3 may be bent at a position at which the end portion 21 of the first member 2 contacts the inner surface of the bend 34 or may be bent at a position at which the end portion 21 does not contact the inner surface of the bend 34.

FIG. 4A illustrates the press heating step. To be specific, in the press heating step illustrated in FIG. 4A, the second member 3 and the first member 2 are pressed and heated at a position near the end portion 32 of the second member 3 by using the pressing member P.

The pressing member P is a plate extending in a direction in which the hem extends. The pressing member P is pressed against a position at which the inner bent portion 22 and the outer bent portion 31 are to be formed. The pressing member P has a sharp edge that is pressed against the first member 2, the second member 3, and the like. The temperature of at least the sharp edge of the pressing member P can be increased. Preferably, the temperature of the pressing member P is increased to a temperature at which the material of the first member 2, which is a thermoplastic resin, softens. The output power and the like of a heating apparatus (not illustrated), which is used to increase the temperature of the pressing member P, may be set in accordance with the material of the first member 2.

After having been heated, the sharp edge of the pressing member P is pressed against the second member 3 and the first member 2. At this time, the first member 2 softens due to the property of its material and the second member 3 deforms due to a stress generated by the pressure, and therefore the sharp edge of the pressing member P penetrates into the second member 3 and the first member 2. Thus, as illustrated FIG. 4A, the brittle portion 23, which has a shape corresponding to that of the sharp edge of the pressing member P, is formed in the first member 2; and the sharp bend 33, which has a shape corresponding to that of the sharp edge of the pressing member P, is formed in the second member 3.

Preferably, when the pressing member P performs pressing and heating, a part of the first member 2 in which the brittle portion 23 is formed has an appropriate thickness.

Figure 4C:
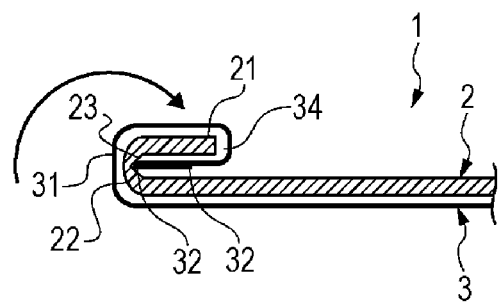

This is preferable because, if the first member 2 has an appropriate thickness when the brittle portion 23 has been formed due to pressing and heating performed by the pressing member P, the thickness does not become excessively small when the first member 2 is bent as illustrated FIGS. 4B and 4C. An appropriate range of the thickness of a part of the first member 2 near the brittle portion 23 is determined in accordance with a strength required for a part of a vehicle in which the present example is used.

FIG. 4B illustrates a second bending step. To be specific, in the second bending step illustrated in FIG. 4B, the first member 2 and the second member 3 are bent so that the first member 2 is disposed inside the second member 3. By bending the first member 2 and the second member 3, the inner bent portion 22 and the outer bent portion 31 are started to be formed as illustrated in FIG. 4B. The second bending step can be performed by using an appropriate bending apparatus, such as a roller forming apparatus. The bending apparatus used in the first bending step may also be used in the second bending step.

Preferably, in the initial stage of the second bending step illustrated in FIG. 4B, bending is started while the pressing member P keeps pressing and heating the first member 2 and the second members 3. In this case, the first member 2 and the second member 3 can be easily bent at the brittle portion 23 and the sharp bend 33, which have been formed in the press heating step illustrated in FIG. 4A. At this time, the sharp bend 33 of the second member 3 is started to be bent and clamped inside the brittle portion 23 of the first member 2.

The brittle portion 23 and the sharp bend 33 are formed by using the pressing member P only to serve as a starting point of bending. Therefore, the brittle portion 23 and the sharp bend 33 are not easily broken in the process of forming the hemmed structure 1 or when the hemmed structure 1 is being used.

FIG. 4C illustrates a part of the second bending step. To be specific, FIG. 4C illustrates a state in which the second bending step has been finished and the hemmed structure 1 has been formed. Preferably, the second bending step is finished when the first member 2 and the second member 3 have been bent through about 180° in order that the first member 2 and the second member 3 can be securely fixed to each other. When the second bending step is finished, a part of the second member 3 extending from the bend 34 to the end portion 32 through the sharp bend 33 is disposed inside the first member 2.

Through the steps illustrated in FIGS. 3A to 4C, the hemmed structure 1, in which the first member 2 and the second member 3 are securely fixed in position relative to each other, can be formed without using exiting fixing methods, such as welding.

Figure 5:
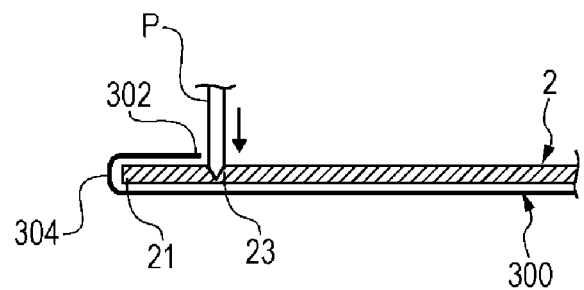
FIG. 5 is a schematic view illustrating a hemming method according to another example of the present invention.

The steps illustrated in FIGS. 3A to 4C are performed to form the hemmed structure 1, which has the sharp bend 33. In order to form the hemmed structure 11 illustrated in FIG. 2B, it is necessary that the sharp bend 33 not be formed. FIG. 5 illustrates a part of a second bending step in which the sharp bend 33 is not formed. FIG. 5 is a schematic view illustrating a hemming method according to another example of the present invention.

In the case where the sharp bend 33 is not to be formed, as illustrated in FIG. 5, only the first member 2 is pressed and heated by using the pressing member P at a position near the end portion 302 of the second member 300. As described above, the length of a part of the second member 300 from the bend 304 to the end portion 302 is smaller than the length of a part of the second member 3 from the bend 34 to the end portion 32. Therefore, the second member 300 is not pressed by the pressing member P. Thus, the brittle portion 23, having a shape corresponding to that of the sharp edge of the pressing member P, is formed in the first member 2, and the second member 300 is not deformed by the pressing member P.

Preferably, the example in which the sharp bend 33 is not formed is used in a case where, for instance, the material of the second member 3 is one of the following materials: a hard material that does not allow the sharp bend 33 to be formed; and a material that tends to cause metal fatigue. When the sharp bend 33 is formed, two portions of the second member 3 are disposed inside the inner bent portion 22. Preferably, the example in which the sharp bend 33 is not formed is used in a case where, for instance, it is desirable that hemmed structure be thin.

Even when the sharp bend 33 is not formed, as long as the bent portions are sufficiently bent by press forming so that the first member 2 and the second member 300 are in close contact with each other, the first member 2 and the second member 300 are rolled onto each other. Therefore, the first member 2, which is made of a resin, and the second member 300, which is made of a metal, are securely fixed in position relative to each other.

The present invention is not limited by the descriptions of the examples described above and the drawings, which are part of the disclosure of the present invention. In other words, other examples, operation technologies, and the like that can be made by persons skilled in the art on the basis of these examples are within the scope of the present invention.

The invention claimed is:

1. A hemmed structure comprising:
    a first member that is a sheet-like member including a thermoplastic resin, the first member including an inner bent portion formed at a position at which an end portion of the first member is bent; and
    a second member that is a sheet-like member including a metal material, the second member including an outer bent portion formed at a position at which an end portion of the second member is bent;
    wherein the outer bent portion is disposed so as to wrap around the inner bent portion, and the end portion of the second member is disposed inside the inner bent portion;
    wherein a thinned portion is formed on an inner surface of the inner bent portion; and
    wherein the second member includes an end portion which includes two substantially parallel flanges joined by a back-bend proximate to the inner bent portion of the first member.

2. The hemmed structure according to claim 1, wherein the back-bend proximate to the inner bent portion of the first member is a sharp back-bend.

3. The hemmed structure according to claim 2, wherein the thinned portion is a recess formed by heating and pressing the first member with a pressing member.

4. The hemmed structure according to claim 3, wherein the thermoplastic resin is a fiber-reinforced plastic.

5. The hemmed structure according to claim 2, wherein the thermoplastic resin is a fiber-reinforced plastic.

6. The hemmed structure according to claim 1, wherein the thinned portion is a recess formed by heating and pressing the first member with a pressing member.

7. The hemmed structure according to claim 6, wherein the thermoplastic resin is a fiber-reinforced plastic.

8. The hemmed structure according to claim 1,
wherein the thermoplastic resin is a fiber-reinforced plastic.

9. A hemming method for making a hemmed structure, the method comprising:
- a placement step of placing a first member and a second member one on top of the other so that an end portion of the first member and an end portion of the second member are displaced from each other, the first member including a thermoplastic resin and having a sheet-like shape, and a second member including a metal material and having a sheet-like shape;
- a first bending step of bending the end portion of the second member so as to wrap around the end portion of the first member;
- a press heating step of forming a thinned portion in the first member by pressing and heating either one of the first member and the second member at a position near the end portion of the second member with the first member and the second member one on top of the other; and
- a second bending step of bending the first member and the second member at the thinned portion so that the end portion of the first member is disposed inside the second member, wherein the second bending step results in the end portion of the second member including two substantially parallel flanges joined by a back-bend proximate to the position of the press heating step.

* * * * *